United States Patent [19]
Lambert et al.

[11] 3,841,765
[45] Oct. 15, 1974

[54] MICRODIFFUSION CELL

[75] Inventors: Jack L. Lambert; Reginald R. Tschorn, both of Manhattan, Kans.

[73] Assignee: Kansas State University Research Foundation, Manhattan, Kans.

[22] Filed: May 17, 1973

[21] Appl. No.: 361,077

[52] U.S. Cl. .................................. 356/246, 23/259
[51] Int. Cl. ............................................ G01n 1/10
[58] Field of Search ........................ 356/246; 23/259

[56] References Cited
UNITED STATES PATENTS
3,246,559  4/1966  Clifford, Jr. ........................ 356/246

OTHER PUBLICATIONS
Determination of Carbon Monoxide in Blood, Lambert et al., Anal. Chemistry, Vol. 44, No. 8, July 72, 1529-1530.

Primary Examiner—Vincent P. McGraw

[57] ABSTRACT

A microdiffusion cell for spectrophotometric analysis comprises an outer casing and an elongated rod reciprocable within the outer casing. The casing includes upper and lower axially aligned tubular portions and an intermediate radially enlarged chamber portion. The chamber portion provides a pair of fluid chambers, and the rod passes through one of the chambers. Sealing means on the rod engages the upper and lower tubular portions to hermetically seal the chambers, and means are provided for introducing fluid into the chambers without destroying the hermetic seal. The rod is provided with a slot or opening for holding a quantity of the fluid in the surrounding chamber, and the rod is reciprocable between a first position in which the opening in the rod is positioned within the chamber and a second position in which the opening is positioned in one of the tubular portions of the casing to permit spectrophotometric analysis of the fluid contained in the opening.

12 Claims, 4 Drawing Figures

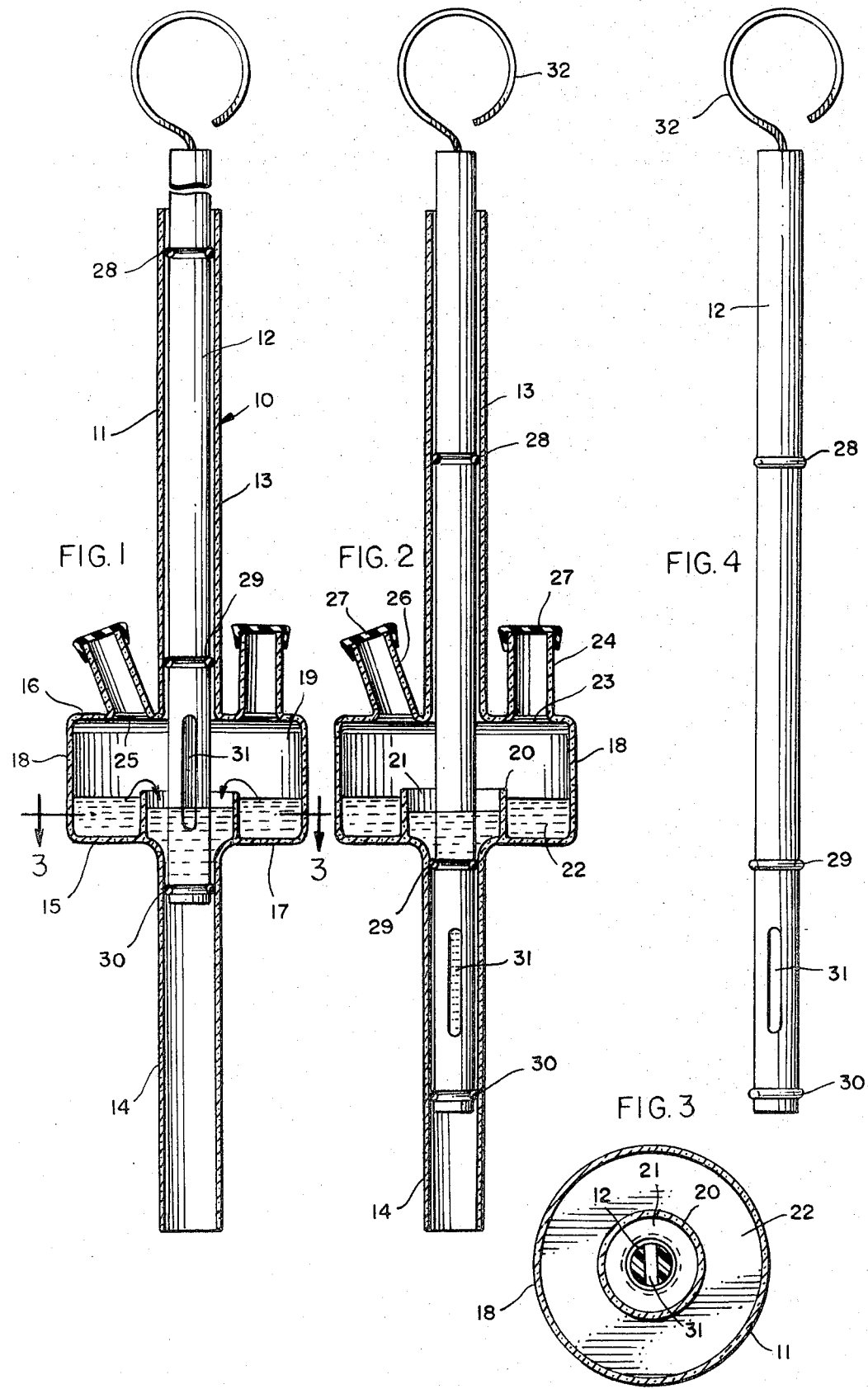

MICRODIFFUSION CELL

BACKGROUND

This invention relates to a microdiffusion cell which is particularly suitable for spectrophotometric analysis of fluids.

The invention will be explained in conjunction with the determination of carbon monoxide in blood by spectrophotometric analysis, but it will be understood that the apparatus can be used for other analyses. Determination of carbon monoxide in blood (carboxyhemoglobin) is important, for example, in the diagnosis of carbon monoxide poisoning. Several basic quantitative methods for carbon monoxide determination are discussed in an article co-authored by the inventors and entitled "Determination of Carbon Monoxide in Blood," published in "Analytical Chemistry." vol. 44, p. 1529, July, 1972. Some methods make use of a microdiffusion cell and a colorimetric reagent which permits spectrophotometric analysis. Microdiffusion analysis and microdiffusion cells are discussed in "Microdiffusion Analysis and Volumetric Air," by E. J. Conway, 5th ed., Crosby Lockwood and Son, Ltd., London, 1962, pp. 1–15.

In conventional microdiffusional cells, the sample is placed in one compartment or chamber and a reagent is placed in an adjacent chamber. A chemical is added to the sample to create a gaseous product which includes the variable sought to be measured, and the gaseous product is caused to distill over and be absorbed by the test solution in the adjacent compartment. After the microdiffusion has taken place, a test sample is taken from the test solution and subjected to analysis, such as analysis by a spectrophotometer.

The foregoing procedure required considerable handling of the sample and test solution and does not permit the analysis to be carried out inside a closed system in which gaseous material cannot enter or leave.

SUMMARY

The invention provides an apparatus which permits an analyst to carry out volatization reactions in a closed system. The sample and reagent solutions can be added to the apparatus while maintaining the closed system by adding the solutions through a self-sealing septum or membrane. The reaction is then carried out without air or other gases either entering or leaving the apparatus. After diffusion has occurred, the rod can be moved longitudinally to remove a portion of the reagent from the reagent chamber and to position this quantity of the test solution in one of the tubular portions of the cell for spectrophotometric analysis. The spectrophotometric analysis is made while the closed system is maintained wihin the apparatus. A number of measurements can be made at various time intervals by returning the rod to its original position and then withdrawing a new quantity of reagent at a later time, all while maintaining the closed system.

DESCRIPTION OF THE DRAWING

The invention will be explained in conjunction with an illustrative embodiment shown in the accompanying drawing, in which FIG. 1 is an elevational sectional view, partially broken away, of an apparatus formed in accordance with the invention with the reciprocable rod in a raised position;

FIG. 2 is a view similar to FIG. 1 showing the reciprocable rod in a lowered position;

FIG. 3 is a sectional view taken along the line 3—3 of FIG. 1; and

FIG. 4 is an elevational view of the rod.

DESCRIPTION OF SPECIFIC EMBODIMENT

The numeral 10 designates generally a microdiffusion cell which comprises an outer casing 11 and plunger means provided by a rod 12 which is reciprocable within the outer casing. The casing includes an upper hollow or cylindrical tubular portion 13, a lower hollow or cylindrical portion 14, and an intermediate radially enlarged chamber portion 15.

The chamber portion 15 includes a top wall 16 which extends radially outwardly from the upper tube 13, a bottom wall 17 which extends radially outwardly from the bottom tube 14, and a cylindrical outer side wall 18 which extends between the top and bottom walls to provide a cylindrical chamber 19 there within. A cylindrical wall or partition 20 extends upwardly from the bottom wall 15 outwardly of the bottom tubular portion 14 to provide a first fluid chamber 21 inside the partition and a second chamber 22 between the partition and the outer wall. In the embodiment illustrated, the partition extends upwardly for slightly less than half of the height of the chamber portion.

An opening or port 23 is provided in the top wall of the chamber portion above the annular outer chamber 22, and a guide tube 24 extends upwardly from the opening 23 substantially parallel with the upper tube 13. A second opening 25 is provided in the top wall adjacent the upper tube 13, and a guide tube 26 extends angularly outwardly and upwardly from the opening 25. The axis of the angled tube 26 extends into the inner chamber 21 above the top edge of the partition 20 to permit introduction of fluid into the inner chamber in a manner hereinafter described. A self-sealing septum or membrane 27 is attached to the outer end of each of the guide tubes 24 and 26. The septum may be made from rubber or other suitable material which can be punctured by a syringe needle and which reseals after the needle is withdrawn.

The upper and lower tubes 13 and 14 are axially aligned, and the elongated rod 12 is reciprocable or axially slidable within the tubes. The particular rod illustrated is solid in cross-section, and three resilient O-rings or gaskets 28, 29, and 30 are positioned in annular grooves formed in the outer surface of the rod. The bores of the tubes 13 and 14 are sized relative to the diameter of the rod 12 so that the rod is relatively snugly received by the tubes, and the O-rings sealingly engage the walls of the bores as the rod reciprocates to provide a hermetic seal between the O-rings. An elongated slot or opening 31 extends through the rod adjacent the lower end thereof between the O-rings 29 and 30, and a handle or loop 32 is attached to the other end of the rod to facilitate reciprocation of the rod within the casing.

In operation a reagent or test solution is added to the inner compartment 21. The rod extends through the inner compartment 21, and the effective fluid-holding volume of the inner compartment is therefore annular in cross-section. If a closed system is to be maintained, the reagent can be added to the inner compartment by means of a needle-equipped syringe. The needle is inserted through the septum 27 of the guide tube 26, and the angled tube guides the needle into the inner chamber between the partition 20 and the rod 12. A portion of the reagent enters the slot 31 of the rod, and the rod is then lowered from the raised position illustrated in FIG. 1 to the lowered position illustrated in FIG. 2 in which the slot is positioned within the lower tube 14. The slot is filled as it passes through the reagent, and the reagent carried by the slot is positioned in the beam of a spectrophotometer when the rod is in the lowered position. The spectrophotometer is adjusted to zero absorbance, and the rod is then returned to the FIG. 1 position.

The sample which is to be analyzed is then added to the outer compartment 22. If a closed system is desired, the sample can be introduced by inserting a syringe through the septum 27, and the guide tube 24 guides the needle of the syringe into the outer compartment. A suitable chemical is also added to the outer compartment to create the desired gaseous product which is to be diffused into the reagent. The apparatus may be rotated, if desired, to insure mixing of the sample and the chemical. As indicated by the arrows in FIG. 1, the gas diffuses through the space above the partition 20 and into the inner chamber where it is absorbed by the reagent.

When analysis of the reaction is desired, the rod is again lowered to the FIG. 2 position, and the solution carried by the slot 31 is positioned in the beam of the spectrophotometer. A number of measurements can be made at time intervals throughout the microdiffusion process by raising the rod to the first position after each measurement, and then lowering the rod with a new quantity of test solution when the next measurement is desired.

Throughout the addition of the liquids, the diffusion process, and the spectrophotometric analysis, a closed system is maintained within the apparatus. When the rod is in the raised position of FIG. 1, the O-ring 30 prevents leakage of the reagent from the inner chamber, and the O-rings above and below the chamber portion of the casing hermetically seal the chamber portion. The hermetic seal of the compartment within the chamber portion is maintained as the rod is reciprocated by the upper and lower O-rings 28 and 30.

In the specific example described in the aforementioned article entitled "Determination of Carbon Monoxide in Blood," 10 milliliters of heparinized chicken blood, 12.0 ± 0.01 grams of hemoglobin per 1,000 ml, was equilibrated with pure carbon monoxide in a 125 ml flask for 30 minutes in a mechanical shaker at 41°C. Dilutions of 75, 50, and 25 percent saturation were made with CO-free blood. 1 ml of reagent was added to the inner compartment 21, the rod was lowered, and the spectrophotometer beam was passed through the reagent in the slot 31. The spectrophotometer was set at zero absorbance at 522 nm. The rod was then returned to the raised position. Syringes were used to add 2.00 ml of blood sample and 2.00 ml of 10 percent sulfuric acid to the outer compartment 22. Absorbance measurements were made at 5 minute intervals for a period of one hour by lowering the rod at each interval into the spectrophotometer beam.

Although we have described the apparatus as including three sealing members 28-30, the apparatus can be used with two sealing members 28 and 30, which will maintain the chamber portion sealed during reciprocation of the rod. However, the middle sealing member 29 is advantageous if only one analysis is to be made since this member would prevent upward diffusion of gas within the space between the rod and the upper tube 13 and thereby increase the accuracy of the analysis. If a plurality of analyses are to be made, the middle sealing member might trap a portion of evolved gas above it each time it was raised into the upper tube 13. Accordingly, for multiple-measurement use of the middle sealing member might be eliminated. If the middle sealing member is an O-ring, it can be removed and installed as desired.

As described herein, the microdiffusion cell is particularly suitable for use with a Bausch & Lomb Spectronic 20 spectrophotometer which is provided with a passageway through the instrument. A test tube carrying the sample to be measured is positioned in the passageway, and the spectrophotometer beam passes through the passageway and the sample. When a measurement is to be made with our microdiffusion cell, the lower tubular portion 14 of the cell can be inserted into the passageway of the spectrophotometer to position the slot in the rod and the liquid carried thereby in the path of the beam. The cell is not limited for use with a Bausch & Lomb spectrophotometer, however.

The outer casing, or at least the lower tubular portion 14 thereof, is formed of optical grade glass or plastic to permit spectrophotometric analysis. We have had good results by forming the rod from solid Teflon plastic.

In one specific embodiment of the microdiffusion cell for use in the determination of carbon monoxide in blood, the length of the outer casing from the top of the upper tube 13 to the bottom of the lower tube 14 was 230 mm, the length of the upper tubular portion 13 was 107 mm, the axial length of the chamber portion 15 was 27 mm, and the length of the lower tubular portion 14 was 96 mm. The inside diameter of the tubular portions was 10 mm, and the outside diameter of the chamber portion 15 was 55 mm. The outside diameter of the cylindrical partition 21 was 20 mm, and the inside diameter of the guide tubes 24 and 26 was 6 mm. The rod 12 was 200 mm long, and its diameter was 9 mm. The bottom of the slot 31 was 16 mm from the bottom end of the rod, and the slot was 23 mm long and 3 mm wide. The O-ring 28 was 63 mm from the upper end of the rod, the O-rings 28 and 29 were spaced 87 mm apart, and the O-ring 29 was 11 mm above the upper end of the slot.

The particular sealing means in the specific embodiment illustrated comprises O-rings received in annular grooves in the rod. However, it will be understood that other suitable sealing means can be used. For example, in the aforementioned article entitled "Determination of Carbon Monoxide in Blood," the entire length of the rod was milled down to the desired diameter except at the locations of the sealing flanges, which extended radially outwardly from the milled-down remainder of the rod to provide a fluid-tight seal with the walls of the bores of the tubular portions.

Although we have described the operation of the cell in conjunction with a test for determination of carbon monoxide in blood, the apparatus can be used for other analyses for volatile substances in water, many solids (with digestion reactions), and biological fluids such as blood. Volatile components of blood that could be analyzed are carbon monoxide (carboxyhemoglobin), ammonia, oxygen (hemoglobin), carbon dioxide, hydrogen cyanide, hydrogen sulfide, phenols, formaldehyde and acetone.

While in the foregoing specification a detailed description of specific embodiments of the invention were set forth for the purpose of illustration, it is to be understood that many of the details herein given may be varied considerably by those skilled in the art without departing from the spirit and scope of the invention.

We claim:

1. An apparatus for fluid analysis comprising an outer casing and a plunger means within the casing, the casing having upper and lower hollow tubular portions and a radially enlarged intermediate chamber portion between the tubular portions, the chamber portion providing a fluid-holding chamber and having means for introducing fluid into the chamber, the plunger means being reciprocable within the tubular portions of the outer casing, sealing means between the plunger means and each of the upper and lower tubular portions of the outer casing, the plunger means being provided with fluid-holding means between the sealing means for holding a quantity of fluid and being reciprocable between a first position in which the fluid-holding means thereof is positioned within the fluid-holding chamber of the outer casing and a second position in which the fluid-holding means thereof is positioned within one of the tubular portions of the outer casing whereby fluid can be withdrawn from the fluid-holding chamber by the fluid-holding means of the plunger means for analysis in said one tubular portion.

2. The apparatus of claim 1 in which the plunger means comprises an elongated rod and the fluid-holding means therefor is provided by a slot formed in the rod.

3. The apparatus of claim 1 including partition means within the chamber portion defining first and second fluid-holding chambers, the elongated tube passing through one of the fluid-holding chambers.

4. The apparatus of claim 3 in which the chamber portion includes an outer wall and the partition means comprises a generally cylindrical wall surrounding the plunger means to provide a generally annular space therebetween, one of the fluid-holding chambers being provided by the generally annular space and the other fluid-holding chamber being provided between the generally cylindrical wall and the outer wall of the chamber portion.

5. The apparatus of claim 4 in which the means for introducing fluid includes an opening provided in the chamber portion for each of the first and second fluid-holding chambers and a puncturable self-sealing member covering each opening whereby fluid can be introduced to each fluid-holding chamber by a needle-equipped syringe by puncturing the associated self-sealing member with the needle.

6. The apparatus of claim 1 in which the means for introducing fluid into the fluid-holding chamber includes an opening provided in the chamber portion and a puncturable self-sealing member covering the opening whereby a fluid can be introduced into the fluid-holding chamber by a needle-equipped syringe by puncturing the self-sealing member with the needle.

7. The apparatus of claim 1 in which the sealing means includes first and second O-rings carried by the plunger means, the first O-ring sealingly engaging the upper tubular portion of the outer casing and the second O-ring sealingly engaging the lower tubular portion of the outer casing whereby the fluid-holding chamber is maintained substantially gas-tight and fluid within the fluid-holding chamber is prevented from leaking past the sealing means.

8. The apparatus of claim 7 including a third O-ring carried by the plunger means between the first and second O-rings, the third O-ring sealingly engaging one of the tubular portions of the outer casing when the plunger means is in the first position and sealingly engaging the other tubular portion when the plunger means is in the first position and sealingly engaging the other tubular portion when the plunger means is in the second position.

9. A microdiffusion cell for spectrophotometric analysis comprising an outer casing and an elongated rod within the casing, the casing having upper and lower axially aligned tubular portions and a radially enlarged chamber portion between the upper and lower tubular portions having upper and lower walls extending generally radially outwardly from the upper and lower tubular portions, respectively, and an outer wall extending between the upper and lower walls, a generally cylindrical partition extending upwardly from the lower wall radially outwardly of the lower tubular portion and terminating below the upper wall to provide a first chamber inside the partition and a second chamber between the partition and the outer wall, the outer casing including means for introducing fluid into the chambers, the rod extending through the first chamber and being reciprocable within the upper and lower tubular portions, upper and lower sealing means carried by the rod, the upper sealing means sealingly engaging the upper tubular portion as the rod reciprocates and the lower sealing means sealingly engaging the lower tubular portion as the rod reciprocates whereby the first and second chambers are maintained substantially gas-tight as the rod reciprocates, the rod being provided with an opening between the upper and lower sealing means for holding a quantity of fluid and being reciprocable between a raised position in which the opening in the rod is positioned within the first chamber and a lowered position in which the opening in the rod is positioned within the lower tubular portion of the outer casing whereby a fluid can be withdrawn by the opening in the rod from the first chamber to the lower tubular portion for spectrophotometric analysis.

10. The microdiffusion cell of claim 9 in which the means for introducing fluid into the chambers includes an opening provided in the chamber portion for each of the first and second chambers and a self-sealing septum covering each opening whereby fluid can be introduced to each chamber by a needle-equipped syringe by puncturing the septum with the needle.

11. The microdiffusion cell of claim 10 in which the opening for the first chamber is provided by a guide tube extending from the upper wall of the chamber portion at an angle with the upper tubular portion, the axis of the guide tube extending generally into the fluid chamber between the cylindrical partition and the rod, the septum for the opening being mounted on the upper end of the guide tube.

12. The microdiffusion cell of claim 11 in which the opening for the second chamber is provided by a guide tube which extends upwardly from the upper wall of the chamber portion generally parallel to the upper tubular portion.

* * * * *